United States Patent [19]

Naffziger

[11] 4,162,156

[45] Jul. 24, 1979

[54] PROCESS FOR MELTING CAST IRON BORINGS

[75] Inventor: Dewein H. Naffziger, Warren, Ohio

[73] Assignees: Advance Achievement Systems, Inc., Warren, Ohio; Wisconsin Centrifugal Inc., Waukesha, Wis.

[21] Appl. No.: 792,553

[22] Filed: May 2, 1977

[51] Int. Cl.$^2$ .............................................. C21C 5/52
[52] U.S. Cl. .......................................... 75/12; 75/43; 75/44 S
[58] Field of Search ................. 75/10 R, 44 S, 12, 13, 75/43

[56] References Cited

U.S. PATENT DOCUMENTS 3,463,864  8/1969  Tama ........................................ 13/33

Primary Examiner—M. J. Andrews
Attorney, Agent, or Firm—Squire, Sanders & Dempsey

[57] ABSTRACT

Process for melting cast iron borings comprising continuously charging dried borings into a coreless induction furnace operated within controlled metal levels to achieve adequate stirring of the molten metal in the furnace, drawing incoming borings beneath the meniscus of the molten metal surface, controlling the dissolved oxygen content of the molten metal to ensure formation of carbon oxide and thus achieve a "slag free" operation. The rate of feed of the borings is controlled according to the power input to maintain a predetermined constant temperature of the molten metal. Apparatus relating to the foregoing process is also disclosed.

10 Claims, 4 Drawing Figures

PROCESS FOR MELTING CAST IRON BORINGS

This invention relates to the melting of finely divided cast iron particles such as borings, chips and turnings. More particularly, it relates to the continuous "slag free" melting of this finely divided charge material in a coreless induction furnace.

For the purpose of definition, borings, chips and turnings will hereinafter be referred to as borings. Cast iron borings are generated daily in sizeable quantities through various machining operations performed on cast iron castings. When the borings are charged directly into a coreless induction furnace of the type set forth in U.S. Letters Patent No. 3,463,864 to Mario Tama, any entrained cutting oil on the borings vaporizes and burns producing considerable air pollution. When any wet or oily borings become submerged in the molten metal, the liquids vaporize, expand many times in volume and displace molten metal from the furnace.

When borings are dried to avoid the aforementioned problems, they will not readily melt due to the generation of slag and their entrappment therein. This slag generation represents the loss of valuable metallic constituents through an oxidation reaction, increased refractory consumption, and general reduction in utilization of the coreless induction furnace. Consequently, cast iron borings are not used extensively as charge material for the coreless induction melting facilities. In fact, there is no known continuous coreless induction melting operations melting 100% cast iron borings other than by use of the invention herein described and claimed which achieves a controlled oxygen content of the molten metal within predetermined metal levels at predetermined temperatures and which secures a "slag free" operation and controlled metal chemistry.

It is also interesting to note that of the other types of melting equipment, namely, (1) the arc furnace, (2) the cupola, or (3) the air furnace, none provides efficient melting of cast iron borings. The great majority of borings are currently (1) "hot or cold" briquetted for use as charge material in the cupola, or (2) used as a substitute for iron ore in the blast furnace steel making operations. Cold briquetted borings used in the cupola charge break apart as they descend in the cupola with considerable loss of the ferrous fines as they become oxidized and/or blown from the stack by the combustion gases. Hot briquetted borings represent a considerable increase in processing costs as compared to cold briquetted borings and can be used in limited quantities in the cupola.

It is an objective of this invention to provide a means whereby cast iron borings can be melted efficiently and continuously in a coreless induction furnace without the problems hereinbefore recited in prior melting practices and achieves the economically favorable charge material processed by the invention herein.

It is therefore an object of the present invention to provide an improved means and process for melting cast iron borings, and the invention represents improvements over previouslyfiled U.S. applications covering inventions of the present invention, namely, Ser. No. 165,922 filed July 26, 1971, and Ser. No. 421,244 (both abandoned).

Another object is to provide a means and process for melting cast iron borings in a continuous manner.

Another specific object is to provide a means and process for avoiding the generation of slag in the melt of a coreless induction furnace used for melting cast iron borings.

A further object is to melt cast iron borings in an efficient, effective and practicable manner.

Other objects will be apparent from the description to follow and from the appended claims.

The present invention involves means and a process for melting cast iron borings comprising continuously feeding borings into a coreless induction furnace wherein the melt level is regulated to achieve adequate stirring to immediately draw the borings beneath the meniscus of the molten metal surface in the furnace, and the borings are fed into the furnace at a rate whereby the dissolved oxygen content of the molten metal contained in the furnace will not exceed the silicon/silicondioxide ($Si/SiO_2$) equilibrium, and the melt is maintained within a specified temperature range above the silicon-dioxide/carbon monoxide ($SiO_2/CO$) inversion temperature.

Figure 1:
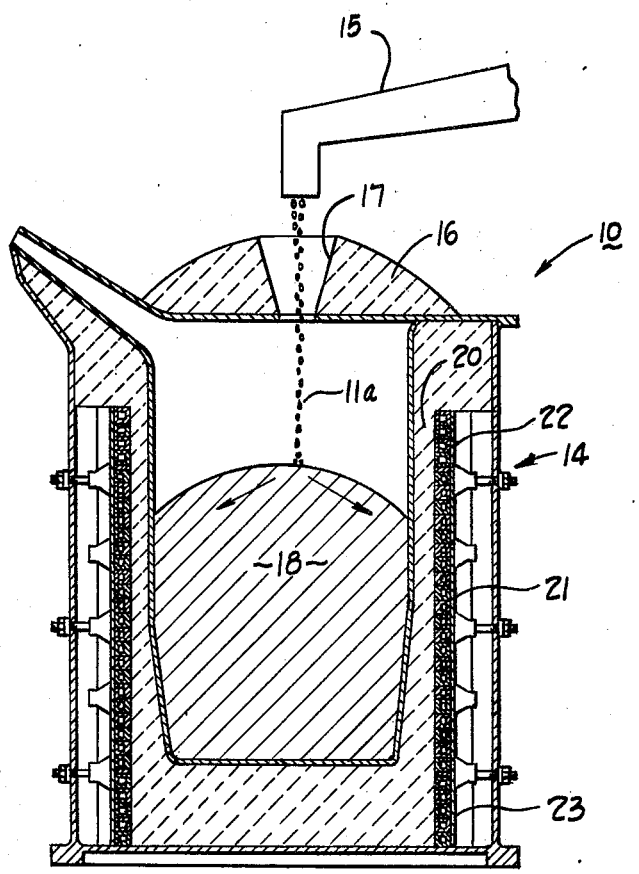
FIG. 1 is a schematic representation of a system according to the invention.
Figure 2:
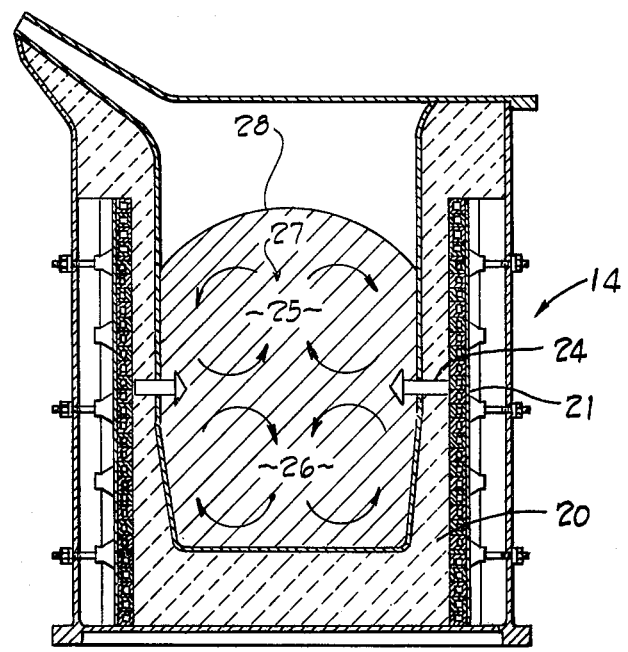
FIG. 2 is a vertical cross section of a coreless induction furnace showing the internal quadrantial molten metal stirring pattern and molten metal meniscus.

Referring to the drawings, in all of which, like parts are designated by like reference characters, FIG. 1 shows the general concept of the melting process generally indicated at 10. Borings 11a are continuously fed into the coreless induction furnace 14 by means of a controlled rate feeder 15 which may be of the vibratory, oscillating, screw or belt type conveyor type. In the event the borings contain noticeable moisture and/or hydrocarbons, a drier (not shown) would be used to vaporize and remove both said oil and water volatiles, and if desired, a storage hopper (not shown) could be provided to provide a surge storage bin for the dried borings 11a during non-charging periods to the furnace 14 and/or to supply dried borings 11a to the furnace 14 during down-time periods of the drier 12. The coreless induction furnace 14 is equipped with a cover 16 in which there is a centrally located opening 17 through which the dried borings 11a are fed from the feed at a controlled rate. It is important that the dried borings 11a be fed into the center of the molten metal heel 18 in the coreless induction furnace generally indicated as 14 so that the particulate matter is charged into the meniscus of the molten metal.

The coreless induction furnace, generally indicated as 14, consists of a molten metal heel 18 contained within a refractory lining 20 which is surrounded by the power coil 21. Some coreless furnace are equipped with additional cooling coils at either and/or each end of the power coil. These are shown as the top cooling coil 22 and bottom cooling coil 23. When electrical energy is applied to the power coil 21, the molten metal 18 is acted upon by the mutual repulsion of the magnetic field generated about the coil 21 and the magnetic field generated in the molten metal heel 18. The force of this magnetic repulsion upon the molten metal heel 18 is depicted by arrows 24 and forces the metal away from the refractory sidewalls 20 at the center of the power coil 21. As the radially inward moving metal collides in the center of the furnace, quadrantial stirring is effected and a portion of the metal moves upward and a portion of the metal moves downward as depicted by the arrows 25 and 26 respectively. The metal moving upward in the center of the furnace depicted by the arrow 25 forms a curved surface of the metal known as the meniscus 28. The resulting metal flow is depicted by the stirring pattern 27. The height of the meniscus 28 for a furnace varies directly with the level of metal within the furnace and the applied power input.

Figure 3:
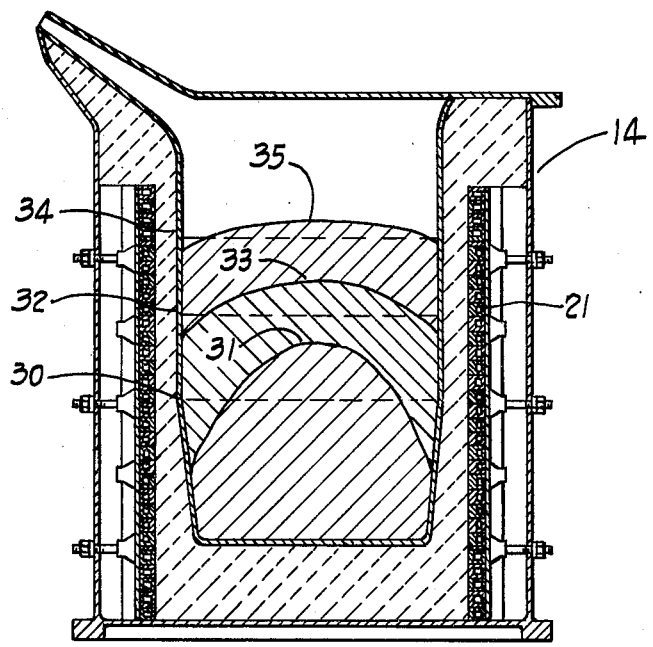
FIG. 3 is a vertical cross section of a coreless induction furnace showing the meniscus shape as a function of metal depth within the furnace for a given power input.

FIG. 3 shows how the meniscus changes in form for a given power input as a function of the metal level in the furnace. The meniscus that results when power is applied for metal level 30 is shown at 31; in the same manner, the meniscus for metal level 32 is shown at 33, and the meniscus for metal level 34 is shown at 35. As the metal level moves above the power coil 21, the meniscus decreases in height approaching a flat surface.

When melting borings, I require the borings to be drawn beneath the molten metal surface. This can only be accomplished when the stirring action is adequate. I have found that the metal level should never exceed 105% of the power coil 21 height for the present application.

Also because the boring must be charged into a molten metal heel, the amount of metal tapped from the furnace should never reduce the metal level below 50% of the power coil 21 height.

The borings 11a fed into the furnace melt, are always oxidized to some degree and are coated with iron oxide, $Fe_2O_3$. If oxidized borings were charged to the molten metal and did not submerge beneath the surface, the iron oxide coating of said borings would form a slag. This slag would remain atop the molten metal surface and entrap other borings which in turn would further oxidize. The cycle then would worsen and little to no melting occurs.

However, when the borings are submerged as described herein, the following reactions take place. First, the submerged borings do not form a surface slag. Rather, the iron oxide ($Fe_2O_3$) coating is heated by the molten metal within which it is submerged and is changed to the more stable high temperature iron oxide (FeO) phase as defined by equation 1.

$$Fe_2O_3 + Fe\ (1) \rightarrow 3FeO \qquad (1)$$

Since oxygen will dissolve in molten iron, the FeO dissociates according to and defined by equation 2.

$$FeO\ (1) \rightarrow Fe\ (1) + (\%0) \qquad (2)$$

The amount of oxygen that can be dissolved in molten iron can be calculated with the aid of published thermodynamic data found in the technical literature and expressed in equation 3.

$$\log (\%0) = -6316/T - 2.73 \qquad (3)$$

where T is in degrees Kelvin.

Figure 4:
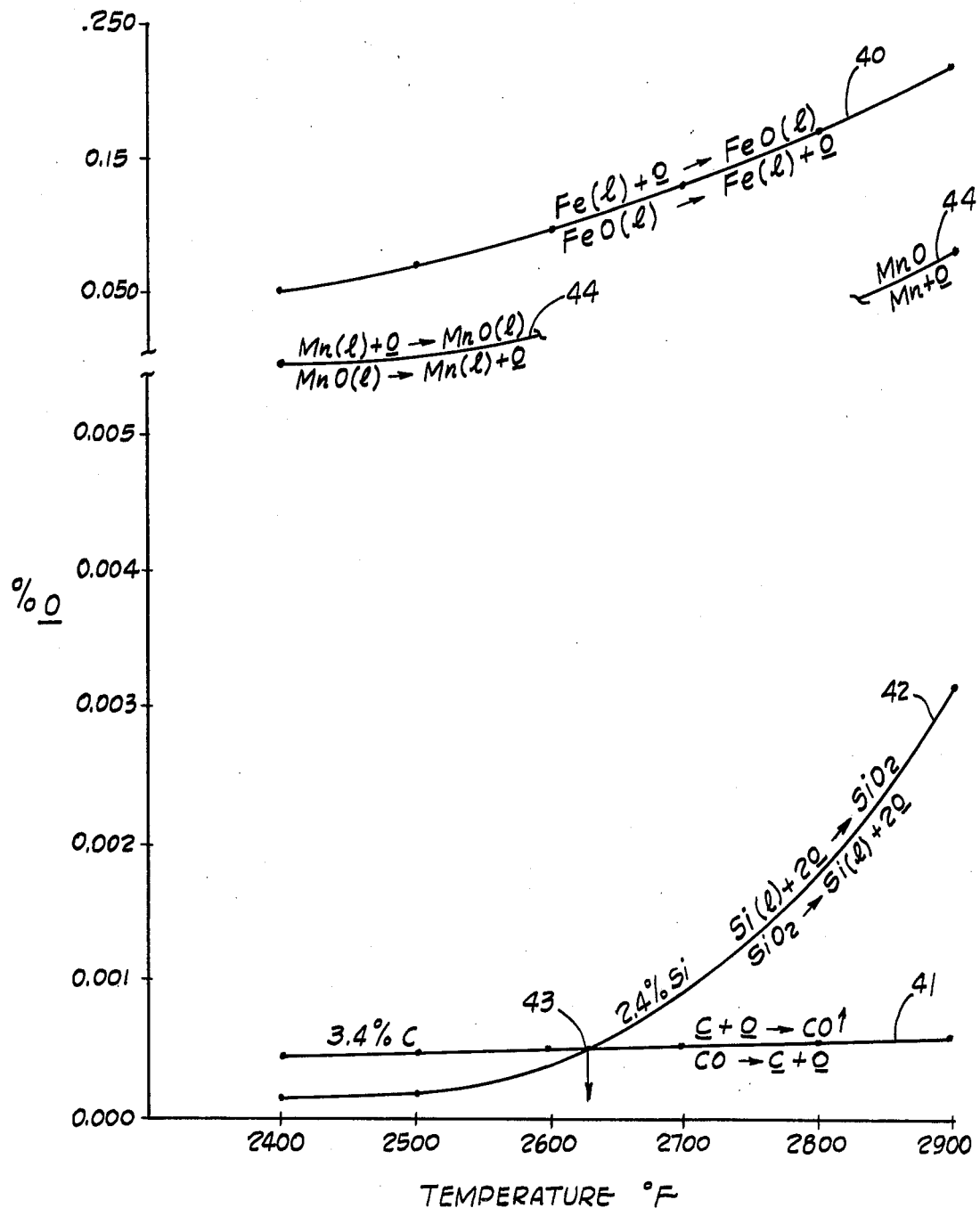
FIG. 4 is a graph showing equilibrium states for various chemical reactions which may occur in the melt, as a function melt temperature and the dissolved oxygen concentration in the melt.

Curve 40 in FIG. 4 shows the equilibrium oxygen concentration of the Fe-O system as a function of temperature.

Because cast iron contains carbon and silicon, I have also determined what effect these alloying elements have. The amount of oxygen that can dissolve in molten iron with carbon and silicon present is calculated and defined by equations 4 and 5.

$$\log (\%0)(\%C) = -1169/T - 2.07 \qquad (4)$$

$$\log (\%0)^2(Si) = -31,031/T + 12.02 \qquad (5)$$

where T is in degrees Kelvin.

Curve 41 in FIG. 4 represents the amount of oxygen that would be in equilibrium in an iron-carbon alloy containing 3.4% carbon. Curve 42 in FIG. 4 represents the amount of oxygen that would be in equilibrium in an iron-silicon alloy containing 2.4% silicon.

FIG. 4 illustrates that if the oxygen concentration in molten iron gets above curve 40, oxides of iron (FeO), silicon ($SiO_2$), and carbon (CO) will simultaneously form. The FeO and the $SiO_2$ will combine and form slag constituents which will rise to the surface of the melt or be deposited as a build-up on the refractory lining (20), while CO will evolve from the melt as a gas.

If the oxygen concentration is maintained below curve 40, but above curve 42, only oxides of silicon ($SiO_2$) and carbon (CO) will form. Again, the $SiO_2$ will either form a surface slag or be deposited on the refractory lining 20 while CO evolves from the melt as a gas. If the oxygen concentration is held below curve 42 and above curve 41, only oxide of carbon (CO) will form. Since it is a gas, no surface slag will result.

Hence, to provide "slag free" melting of cast iron borings containing 3.4% carbon and 2.4% silicon in a molten heel of metal contained in the induction furnace of the same composition of contained carbon and silicon, the borings are preferably introduced at a temperature above point 43 and at a rate that will not allow the oxygen concentration to exceed the limits defined by curve 42. I prefer to charge the borings at a temperature of not less than 100° F. or above the temperature at point 43 of FIG. 4.

The point 43 where curves 41 and 42 intersect, is called the inversion temperature for the reaction defined by equation 6.

$$SiO_2 + 2C \rightarrow Si + 2CO \qquad (6)$$

This temperature can be calculated for any carbon/silicon analysis in molten iron with the aid of equation 7. For the 3.4% carbon and 2.4% silicon alloy of iron as mentioned above, the inversion temperature calculates to be 2607° F.

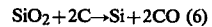

$$T = \frac{-28,693}{\log \frac{(\%Si)}{(\%C)^2} - 16.16} \qquad (7)$$

where T is in degrees Kelvin.

The melting of cast iron borings in the coreless induction furnace must be a tap and charge operation. That is, when the melt level has reached the upper limit, as previously defined, the charging and power application to the furnace is discontinued. The controlled rate feeder 15 of FIG. 1 is then moved to allow the coreless furnace 14 to be tapped of a given weight of molten metal.

I have experimentally melted borings in the manner described above for varying analysis cast iron borings to produce varying predetermined analysis molten metal by the addition of alloying elements to be used for the production of both cast iron castings and for the production of secondary metal in the form of cast pigs. Cast iron borings which I melted experimentally analyzed a nominal 3.45% carbon, 2.00% silicon, 0.53% manganese, 0.30% chromium, 0.35% molybdenum, 0.50% nickel, 0.40% copper, 0.035% phosphorus, and 0.11% sulfur, balance iron containing iron oxide levels in excess of 1.7% $Fe_2O_3$. The molten heel in the coreless furnace was maintained at the same nominal chemistry as the borings. The borings were dried to a temperature of 650° F. before they were charged into a 16-ton 60 hertz coreless furnace operating at a nominal power level of 3000 KW. When the metal level was varied between 95% and 105% of the power coil height, the borings melted readily "slag free" on a continuous basic with the molten metal heel being maintained at about 2730° F. which was 140° F. above the $SiO_2$/CO inversion temperature as calculated by equation 7 listed herein. When the metal level was raised above the 105% power coil height limit and chips were fed in the manner described maintaining temperatures as high as 2820° F., considerable surface slag resulted and the melting operation was drastically impaired. During a particular test melt where 300 pounds of borings were fed above the 105% power coil height at a temperature of 2820° F. and at a power input of 2900 KW over 50 pounds of slag was generated which analyzed 46.05% $SiO_2$, 29.18% Fe-O, and 9.91% MnO. Manganese losses are inevitable when melting cast iron borings in a slag generating operation because in such case the manganese/oxygen equilibrium curve 44 of FIG. 4 falls between curves 40 and 42 of FIG. 4 and will not intersect curve 41 for the required manganese levels contained in the alloy of cast irons.

The invention has been described in detail with particular reference to the preferred embodiment thereof, but it will be understood that variations and modifications within the spirit and scope of the invention may occur to those skilled in the art to which the invention pertains.

I claim:

1. A process for melting cast iron borings, having a composition containing carbon and a silicon constituent, comprising the steps of:
   (a) continuously charging a quantity of borings to a coreless induction furnace having power coils containing a molten heel of cast iron therein;
   (b) maintaining the level of the melt in said furnace within the range of from about 50% to about 105% of the height of the said power coils for said furnace to establish a meniscus at the upper surface of said melt;
   (c) maintaining the temperature of said melt at not less than about 100° F. above the $SiO_2$/CO inversion temperature T established by the relationship $$T = \frac{-28,693}{\log \frac{(\% \text{ Si})}{(\% \text{ C})^2} - 16.16}$$

where T is expressed in degress Kelvin; and,
   (d) controlling said charging step to introduce said borings at a rate to maintain the dissolved oxygen content of said melt below the Si/$SiO_2$ thermodynamic equilibrium as shown in FIG. 4 without causing the temperature of said melt to fall below 100° F. above T; wherein said borings are drawn beneath the surface of said melt without surface slag formation.

2. The process as claimed in claim 1, wherein a carbon alloying additive is added to replenish that consumed in oxidation of carbon during the oxidation-reduction reaction so as to maintain a predetermined and desired molten metal chemistry.

3. The process as claimed in claim 1, wherein a storage vessel is employed to accumulate borings during non-charging periods.

4. The process as claimed in claim 1, wherein a storage vessel is employed for continuously feeding dried borings to the induction furnace during periods of down-time on boring preparation equipment.

5. The process as claimed in claim 1, wherein alloying additives may be added to bring the molten metal within the furnace to any desired chemistry within the range of those chemistries defined by the term cast iron other than the composition of the borings.

6. A process as claimed in claim 1 wherein the borings before feeding into the coreless induction furnace are dried to an ambient temperature of not less than 650° F. nor greater than 1350° F. for a length of time sufficient to heat the borings to a temperature of between 500° F. and 650° F.

7. A process as claimed in claim 1 wherein when the furnace is energized, the borings are continuously fed therein at a uniform rate.

8. A process as claimed in claim 1 wherein the rate of feed of the borings is proportional to the power input and the contained oxygen.

9. A process for melting cast iron borings containing carbon and silicon in a coreless induction furnace comprising feeding said borings at a controlled feed rate into molten metal in said furnace, the metal level of which is not more than 105% of the energized power coil height, the borings being charged at a rate which will maintain a substantially constant molten metal temperature of not less than 100° F. above the $SiO_2$/CO inversion temperature T and will maintain the dissolved oxygen content of the molten metal below Si/$SiO_2$ equilibrium levels as shown in FIG. 4, wherein T is defined as $$T = \frac{-28,693}{\log \frac{(\% \text{ Si})}{(\% \text{ C})^2} - 16.16}$$

10. A process for melting cast iron borings, having a composition containing a carbon and silicon constituent in a coreless induction furnace, comprising the steps of:
   (a) establishing a meniscus on a melt of cast iron in a coreless induction furnace;
   (b) controlling the feed rate of cast iron borings to said melt to maintain the dissolved oxygen content thereof below the Si/$SiO_2$ thermodynamic equilibrium level as shown in FIG. 4; and
   (c) maintaining the temperature of said melt sufficiently above the $SiO_2$/CO inversion temperature T to preclude the formation of surface slag thereon; wherein T is expressed in degrees Kelvin and defined by $$T = \frac{28,693}{\log \frac{(\% \text{ Si})}{(\% \text{ C})^2} - 16.16}$$

* * * * *

UNITED STATES PATENT AND TRADEMARK OFFICE
CERTIFICATE OF CORRECTION

PATENT NO. : 4,162,156
DATED : July 24, 1979
INVENTOR(S) : Dewein H. Naffziger

It is certified that error appears in the above-identified patent and that said Letters Patent are hereby corrected as shown below:

Column 3, line 60, example 3 should correctly read as follows:

$$\log (\%0) = \frac{-6316}{T} + 2.73$$

Signed and Sealed this

Tenth Day of March 1981

[SEAL]

Attest:

Attesting Officer

RENE D. TEGTMEYER

Acting Commissioner of Patents and Trademarks